US012726370B2

(12) United States Patent
Cambou et al.

(10) Patent No.: US 12,726,370 B2
(45) **Date of Patent: *Sep. 1, 2026**

(54) PSEUDO-HOMOMORPHIC AUTHENTICATION OF USERS WITH BIOMETRY

(71) Applicant: Arizona Board of Regents on Behalf of Northern Arizona University, Flagstaff, AZ (US)

(72) Inventors: Bertrand F. Cambou, Flagstaff, AZ (US); Michael L. Garrett, Flagstaff, AZ (US)

(73) Assignee: Arizona Board of Regents on Behalf of Northern Arizona University, Flagstaff, AZ (US)

( * ) Notice: Subject to any disclaimer, the term of this patent is extended or adjusted under 35 U.S.C. 154(b) by 103 days.

This patent is subject to a terminal disclaimer.

(21) Appl. No.: 18/397,975

(22) Filed: Dec. 27, 2023

(65) Prior Publication Data

US 2024/0214224 A1 Jun. 27, 2024

Related U.S. Application Data

(60) Provisional application No. 63/435,470, filed on Dec. 27, 2022.

(51) Int. Cl.
*H04L 9/32* (2006.01)

(52) U.S. Cl.
CPC .......... *H04L 9/3278* (2013.01); *H04L 9/3231* (2013.01); *H04L 9/3239* (2013.01)

(58) Field of Classification Search
CPC ... H04L 9/3278; H04L 9/3231; H04L 9/3239; H04L 9/0866; H04L 9/3226
See application file for complete search history.

(56) References Cited

U.S. PATENT DOCUMENTS 7,949,880 B2 5/2011 Champine et al.
8,745,405 B2 6/2014 Pizano et al.
(Continued)

FOREIGN PATENT DOCUMENTS

WO 2022122130 A1 6/2022

OTHER PUBLICATIONS

Cambou, B. et al., "Statistical Analysis to Optimize the Generation of Cryptographic Keys from Physical Unclonable Functions," SAI Computing Conference, IEEE 2020.
(Continued)

*Primary Examiner* — Mohammed Waliullah
(74) *Attorney, Agent, or Firm* — Quarles & Brady LLP

(57) ABSTRACT

Methods for the generation and use of session keys for authentication of a user of a server device are disclosed. The methods use a biological objects of the user to generate responses to challenges. During enrollment, the server device receives a password, hashes it a first number of times, and sends the hash to the user. The user interprets the hash as a set of challenges for the biological object, applies the challenges, and stores the responses. During authentication, the server hashes the password a second number of times, less than the first number, and sends the hash to the user. The user iteratively applies second hash to the biological object, compares the responses to the stored responses, and if there is not a match, hashes the challenges again until there is a match. The number of hashes needed for a match is a session key or subkey.

15 Claims, 9 Drawing Sheets

Similarity with hash functions:
- One way: Hard to uncover C from R
- Weak Collisions: $C \neq C' \Rightarrow R \neq R'$ (most likely)
  $R \neq R' \Rightarrow C \neq C'$ (most likely)

Contrasts with hash functions:
- Unclonable: The objects are unclonable
- Unique: $R_1$ for object 1 ≠ $R_2$ for object 2
- Stochasticity: Presence of random effects
- Sensitive: Subject to environmental effects
- Imperfect: Subject to aging and drifts

(56) References Cited

U.S. PATENT DOCUMENTS

| | | | | |
|---|---|---|---|---|
| 9,646,306 | B1 | 5/2017 | Quigley et al. | |
| 9,967,249 | B2 | 5/2018 | Roth et al. | |
| 10,044,514 | B1 | 8/2018 | Peterson et al. | |
| 10,129,028 | B2 | 11/2018 | Kamakari et al. | |
| 10,140,220 | B2 | 11/2018 | Cambou | |
| 10,177,922 | B1 | 1/2019 | Hamlet et al. | |
| 10,719,858 | B2 | 7/2020 | Mimassi | |
| 10,742,421 | B1 | 8/2020 | Wentz et al. | |
| 10,887,100 | B2 | 1/2021 | Wentz | |
| 11,010,465 | B2 | 5/2021 | Cambou | |
| 11,477,039 | B2 | 10/2022 | Cambou et al. | |
| 12,184,797 | B2 * | 12/2024 | Cambou | H04L 9/3268 |
| 2007/0083918 | A1 * | 4/2007 | Pearce | H04L 63/0428 726/5 |
| 2007/0291106 | A1 * | 12/2007 | Kenrick | H04M 3/42017 348/E7.081 |
| 2007/0291776 | A1 * | 12/2007 | Kenrick | H04M 3/42093 348/E7.081 |
| 2008/0112596 | A1 * | 5/2008 | Rhoads | G06T 1/005 382/115 |
| 2011/0055585 | A1 * | 3/2011 | Lee | H04L 9/3226 713/183 |
| 2011/0138192 | A1 * | 6/2011 | Kocher | H04L 9/003 713/189 |
| 2011/0215829 | A1 | 9/2011 | Guajardo Merchan et al. | |
| 2013/0191899 | A1 | 7/2013 | Eldefrawy et al. | |
| 2015/0242620 | A1 | 8/2015 | Guajardo Merchan et al. | |
| 2018/0034793 | A1 | 2/2018 | Kibalo et al. | |
| 2018/0262331 | A1 | 9/2018 | Noguchi et al. | |
| 2019/0036713 | A1 | 1/2019 | Silk | |
| 2019/0273612 | A1 * | 9/2019 | Sinha | H04L 69/28 |
| 2020/0167504 | A1 | 5/2020 | Oh et al. | |
| 2020/0342112 | A1 | 10/2020 | Plusquellic et al. | |
| 2020/0412521 | A1 | 12/2020 | Shi | |
| 2024/0127614 | A1 | 4/2024 | Kim et al. | |

OTHER PUBLICATIONS

Cambou, B., "Unequally Powered Cryptography with PUFs for networks of Internet of Things Terminals," IEEE Spring Simulation Conference, 2019.

Cambou, B. et al., "Response-Based Cryptographic Methods with Ternary Physical Unclonable Functions," SAI FICC, IEEE 2019.

Cambou, B. et al., "Password Manager Combining Hashing Functions and Ternary PUFs"; 2019 SAIcomputing conference, IEEE; Jul. 2019.

Cambou B. et al., Ternary Computing to Strengthen Cybersecurity, Development of Ternary State based Public Key Exchange, SAI Computing Conference, IEEE 2018.

Cambou, B. et al., "Ternary Computing to Strengthen Information Assurance, Development of Ternary State Based Public Key Exchange," SAI Computing Conference, IEEE 2018.

Cambou, B. et al. "Design of Physical Unclonable Functions with ReRAM and Ternary States," Cyber and Information Security Research Conference, CISR 2016.

Delvaux, J. et al., "Helper Data Algorithms for PUF-Based Key Generation: Overview and Analysis," IEEE Transactions on Computer-Aided Design of Integrated Circuits and Systems, vol. 34, No. 6, pp. 889-902, 2015.

Kang, H. et al., "Cryptographic Key Generation from PUF Data Using Efficient Fuzzy Extractors," In 16th International Conference on Advanced Communication Technology, 2014.

Taniguchi, M. et al., "A Stable Key Generation from PUF Responses with a Fuzzy Extractor for Cryptographic Authentications," In IEEE 2nd Global Conference on Consumer Electronics, 2013.

Regev, O. "New Lattice-Based Cryptographic Constructions," Journal of the ACM, 51(6): 899-942, 2004, https://doi.org/10.1145/1039488.1039490.

Assiri, S. et al., Homomorphic Password Manager Using Multiple-Hash With PUF, Springer, AISC 1363, pp. 772-792, 2021, https://doi.org/10.1007/978-3-030-73100-7_55.

Herder, C. et al., "Physical Unclonable Functions and Applications: A Tutorial," in Proceedings of the IEEE, vol. 102, No. 8, pp. 1126-1141, Aug. 2014, doi: 10.1109/JPROC.2014.2320516.

Suh, G. E. et al., "Physical Unclonable Functions for Device Authentication and Secret Key Generation", Proc. Design Automation Conference, 2007, pp. 9-14.

Guajardo, J. et al., "PUFs and Public Key Crypto for FPGA IP Protection," Conference on Field Programmable Logic and Applications, 2007, 189-195.

Lofstrom, K. et al., "IC Identification Circuits using Device Mismatch," Proc. of ISSCC, 2000, pp. 372-373, http://kl-ic.com/isscc2K.pdf.

Alkabani, Y. et al., "Trusted Integrated Circuits: A Nondestructive Hidden Characteristics Extraction Approach," Information Hiding, 2008.

* cited by examiner

Original Fingerprint

Analysis of the minutiae:

- Two major ones
- Multiple small ones

Pre-enrollment cycle

X-axis:

- Connect main minutiae

Y-axis:

- Orthogonal & central

| Gray Code | | | | | | | |
|---|---|---|---|---|---|---|---|
| 0 | 0000 | 4 | 0110 | 8 | 1100 | 12 | 1010 |
| 1 | 0001 | 5 | 0111 | 9 | 1101 | 13 | 1011 |
| 2 | 0011 | 6 | 0101 | 10 | 1111 | 14 | 1001 |
| 3 | 0010 | 7 | 0100 | 11 | 1110 | 15 | 1000 |

Landmark CRP Mechanism Example: 1-Megapixel Face Scan $SHAKE(SHA3\text{-}256(PW_1)) = 27B24EB3\ DA28FC30\ ...$ $p_{1,1} = (x_{1,1}, y_{1,1}) = (27B, 24E) = (635, 590)$ $L_{1,1} = 83 \bmod 16 = 3$ $Response_{1,1} = ||p_{1,1}L_{1,1}||$

PSEUDO-HOMOMORPHIC AUTHENTICATION OF USERS WITH BIOMETRY

CROSS-REFERENCE TO RELATED APPLICATIONS

The present application claims priority to U.S. Provisional Application 63/435,470 entitled "Pseudo-homomorphic Authentication of Users with Biometry," filed on Dec. 27, 2023, the entirety of which is incorporated herein by reference.

STATEMENT REGARDING FEDERALLY-SPONSORED RESEARCH

Not Applicable.

BACKGROUND

Central organizations managing networks of computing devices, such as private enterprises, financial organizations, financial transaction networks, governments, and various other commercial entities face ongoing challenges by malicious actors seeking to gain access to secure systems with sensitive information. Such entities generally implement stringent methods to prevent malicious use and to ensure that only authorized users have access to sensitive systems. Examples include requests to users and client devices to frequently change passwords, supply tokens generated by multi-factor authentication and mandatory software updates. Users of such systems are accustomed to handle such mandatory requests in a routine manner, without verifying that the server managing security is legitimate Co-assigned U.S. patent application Ser. No. 17/879,697, entitled, PUF-Protected Pseudo-Homomorphic Methods to Generate Session Keys, which is incorporated herein by reference in its entirety, discusses systems and methods for using physical unclonable functions (PUFs) to enable a user to authenticate a server, or a server to authenticate a user, and to generate session keys to enable authenticated communication between a client (user) and server. In one embodiment described in that application, the generation of session keys, initiated by client devices, is based on the use of PUFs embedded in the server. During an initial setup, the client device selects a set of passwords and a set of random numbers to hash the passwords multiple times. The server uses the resulting stream as a set of challenges to generate a set of responses from the PUF, which are stored as reference. To generate a session key, the client device picks a new set of random numbers which are smaller than the initial set of random numbers, to hash its password multiple times; the resulting messages are sent to the server. Using its PUF and the initial responses, the server can find the differences between both random numbers which are used to generate a shared session key. This method is pseudo-homomorphic because the computations never disclose the original passwords. Without the PUF, it is not possible to analyze the information and generate shared keys.

Physical unclonable functions (PUFs) are security primitives that can be used wherever secret or unique random values are needed. A PUF can be described as a one-way digital function $f$ which takes an n-bit challenge C and produces an m-bit response R:

$$f: Bn \rightarrow Bm,$$

$$C \mapsto R$$

where B represents the bits {0, 1}. The function $f$ is a random function that can only be evaluated with the help of a specific physical system and outputs repeatable responses that are different for each physical system and for each challenge. They exploit the intrinsic randomness of a measurable physical characteristics of the PUF system to do this. An integrated circuit (IC) PUF exploits random manufacturing process variation in a specific structure (e.g., an array) of circuits to produce a fixed response for a given challenge. Exemplary PUF devices include PUF devices of the following types: SRAM cells; ring oscillator circuits; gate delay circuits; resistive memory devices such as ReRAMs; ferroelectric memory devices; phase change memory devices; magnetic memory devices; flash memory devices; and one-time programmable memory devices. The relevant common feature for all of these devices is that they have some physical property that can be measured (a response), with a stimulus (a challenge), where the response is random and cannot be predicted without having possession of the PUF, but the response is repeatable when subjected to the same challenge.

This concept of leveraging the unclonable properties of physical objects can be described as a one-way function with a "challenge" to a "response" mechanism. This is shown conceptually in FIG. 1. In the arrangement of FIG. 1, the challenges "C" are the input parameters to the one-way function; the responses "R" are the output parameters, with C being provided to the physical objection according to R=f(C). The challenges are a set of instructions that may be thought of as measurement parameters, conditions or other stimulus being provided to the physical object (e.g., the PUF) to elicit the response. For example, if the object has some appreciable area, or is addressable in some way, the challenges may identify some portion or portions of the unclonable object (e.g., by addresses) needed to generate the responses. The anticipated features of such a scheme include the following attributes, One-way function—the knowledge of the responses R should not disclose the challenges C.

Weak collisions (most of the cases)

Two different challenges should result in two different responses.

Two significantly different responses must be generated from different challenges.

It will be appreciated that these features are also common to mathematical functions, such as cryptographic hash functions, which are also one-way functions. Physical objects differ in important ways from cryptographic hash functions however. Some features of unclonable physical objects that may be contrasted against hash functions include:

Unclonability—Each object (the function generator) is considered as unclonable.

Uniqueness—The object considered here is unique.

Stochasticity—The measurements through physical sensing methods of the unclonable objects are never the same. Certain levels of randomness must be expected.

Sensitivity—The shape of the objects and their measurements can vary in a rather deterministic way with environmental effects such as temperature and humidity.

Imperfection—Unclonable objects are constantly evolving and drifting due to aging and unexpected events damaging them.

Biometric recognition technology is significantly more complex than authentication technology, and its use to support authentication and secure communication faces challenges. Speaking very generally, existing systems for biorecognition involve taking and storing biometric data (or data derived from biometric data), for example, image data of faces, fingerprints, irises or retinal vasculature. Later, an individual interacting with the biorecognition system supplies additional biometric data in a recognition phase, and this data is compared in some way to the previously stored data. During the recognition phase, a large database of biometric prints (e.g., image data in the examples above) has to be analyzed, and the equipment used in real time (e.g., a user's smart phone and camera) is in general different than the one that was used for the initial enrollment. Thus, there is a high chance of false reject rates due to differences in equipment during enrollment—a fact that is further complicated by drift or changes in the biological feature being measured. Additionally, a large database of user biometric data must be stored in a secure manner.

U.S. Pat. No. 10,503,890 entitled "Authentication of images extracted from unclonable objects" filed on Feb. 16, 2007 describes a method to process the image of unclonable objects, including biological objects, for authentication purposes following a process quite similar to the way physical unclonable functions (PUFs) are processed. The disclosure of the aforementioned patent is incorporated herein by reference in its entirety. This patented method describes how the image of the object taken during enrollment can be used for authentication. This image is compared with the image of the same object taken during upfront during enrollment cycle which is kept as reference. The protocol described in this patent is like the one used to authenticate PUFs. While this patent describes a relevant improvement over conventional biometry authentication techniques, it is still susceptible to errors introduced by differences between enrollment and authentication equipment on the user side.

Improvements to authentication systems based on biometry are warranted.

BRIEF SUMMARY

Embodiments of the invention are directed to a system for generating session keys for authenticating a user or a communication session between a server and a user ("client"), and/or for encrypting communications occurring during that session. The inventive systems and methods make use of the unique and unclonable properties of physical objects, for example, biological objects such as finger prints, palms, facial features, retinal vasculature and other vein patterns, iris appearance, and/or image data regarding any of the aforementioned, combinations thereof, image data regarding body gait or infrared images or body parts.

The disclosure herein will use the term "physical objects" to mean, generally, unclonable objects that demonstrate an unpredictable, but repeatable, response in response to a stimulus. Examples of such objects include biological objects that are unique to an individual, such as their fingerprints, retinal vasculature, facial appearance, iris appearance, etc. These properties are unique to an individual, and can be optically measured, and the resulting image data is effectively unclonable, i.e., cannot be reproduced without access to the individual. The unclonability and unicity make these sorts of objects highly valuable for authentication.

Presently, however, there is growing concern regarding protecting the privacy of users relying on their biometric prints (image or other data relating to unclonable biological features) for fast and easy authentication. User authentication methods generally require centralized databases that keep track of biometric information. These databases pose risks to privacy and basic human rights. The inherent risks resulting from existing biometry-based authentication systems includes identity thefts and abuses from centralized institutions. This disclosure presents various methods to exploit biometric information to generate challenge-response pair (CRP) mechanisms which behave as one-way functions, like physical unclonable functions (PUFs) designed with microelectronic components or from optical images. With these CRP mechanisms, methods are described to authenticate users from their biometric information without the storage of this information anywhere, including in the terminal devices.

Inventive embodiments include an initial, pre-enrollment, setup step. The goal the pre-enrollment step is to gather sufficient information to enable the extraction of responses from a biological object (e.g., image data) from a set of challenges (e.g., measurement instructions). In one embodiment, pre-enrollment generates a stored biometric print, that is, a set of data accurately reflecting an unclonable biological object. An example of a stored biometric print would include a processed or unprocessed digital image of a biological object. A stored biometric print would also generally include information about the measurement conditions of generation of the print, such as time and date, illumination conditions (e.g., average radiance or irradiance of the object that generated the print), magnification, illumination spectrum, and geometrical information, such as the position of features in the print relative to some reference axis. In these embodiments, the stored biological print contains sufficient detail to generate responses to whatever challenges will be provided.

In a preferred embodiment, there is no stored image data, but instead, the pre-enrollment process elicits and stores information usable to take real-time measurement data of a biological object during the authentication cycles described below. Such data would include data sufficient to establish standard reference measurement conditions from which responses to challenges can be generated. By way of example, in the case where the biological object is a finger print, the pre-enrollment data will include information sufficient to orient a fingerprint image to a reference axis and to scale it to a standard scale. With such data, any image of the same fingerprint (biological object) can be transformed (i.e., rotated and scaled) to a baseline, reference orientation and scale so that challenge instructions (e.g., locations on the print to be measured) can be consistently applied and responses can be repeatably elicited to the same challenges.

In certain inventive methods, there is also an enrollment procedure. During the enrollment step, a centralized element (e.g., a server) selects a set of passwords and a set of random numbers associated with each password. These two sets are used to generate an initial data stream with pseudo-homomorphic computations (by, e.g., iteratively hashing each password a number of times equal to its corresponding associated random number, and then combining the resulting hashed numbers in some fashion). The initial data stream represents or can be parsed or interpreted to represent instructions setting forth conditions of measurements to be taken of a physical object (i.e., challenges). The terminal device (i.e., a client) receives the data stream, applies the challenges (i.e., measures the physical object, a contemporaneously generated biometric print of the object or a stored biometric print) in accordance with the challenge instructions, and generates a set of responses from this initial data stream.

During an authentication cycle, the centralized element (server) generates a new set of random numbers associated with the set of passwords. Each of the new set of random numbers is smaller than the random number corresponding to the password that was generated during the enrollment step. The centralized element performs pseudo-homomorphic computations (e.g., subjects each password to a hashing operation a number of times equal to the second random number) to generate a second data stream and a session key. With a CRP mechanism (e.g., the ability to take and analyze biometric prints to generate responses), the terminal device independently uncovers the same shared session key from the second data stream and the responses from the initial setup.

The session key, once recovered by the terminal device may be used for authentication and/or encrypted communications between the central and terminal devices. It will be noticed here that the methods described above do not require the transmittal of biometric data between the terminal and central devices. Biometric data (e.g., biometric prints) are never stored at the central device (i.e., the server), and thus, are never at risk of unauthorized access through the central device. Indeed, detailed biometric data (like biometric prints) need never be stored long-term at the terminal device. While biometric data must be taken and measured during pre-enrollment, enrollment, and authentication, that data can (and preferably is) deleted after those cycles.

The aforementioned security advantages are the result of the fact that the unclonable object being used to generate responses is some biological feature of the user, who is always the custodian of that object. However, this results in challenges given the nature of biological objects, which are subject to constant change, damage, and the like. Imperfection in the biological object and sensitivity to environmental effects can be challenging to handle. In certain embodiments, error correcting codes (ECC) are advantageous, but in certain cases, may not be sufficient. In preferred embodiments, drift or instability in the biological objects is addressed by capturing multiple images during enrollment and/or pre-enrollment, and the use of machine learning methods. A few rejects are usually acceptable when the authentication cycles are repeated a limited number of times.

The above features and advantages of the present invention will be better understood from the following detailed description taken in conjunction with the accompanying drawings.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

DETAILED DESCRIPTION

Figure 1:
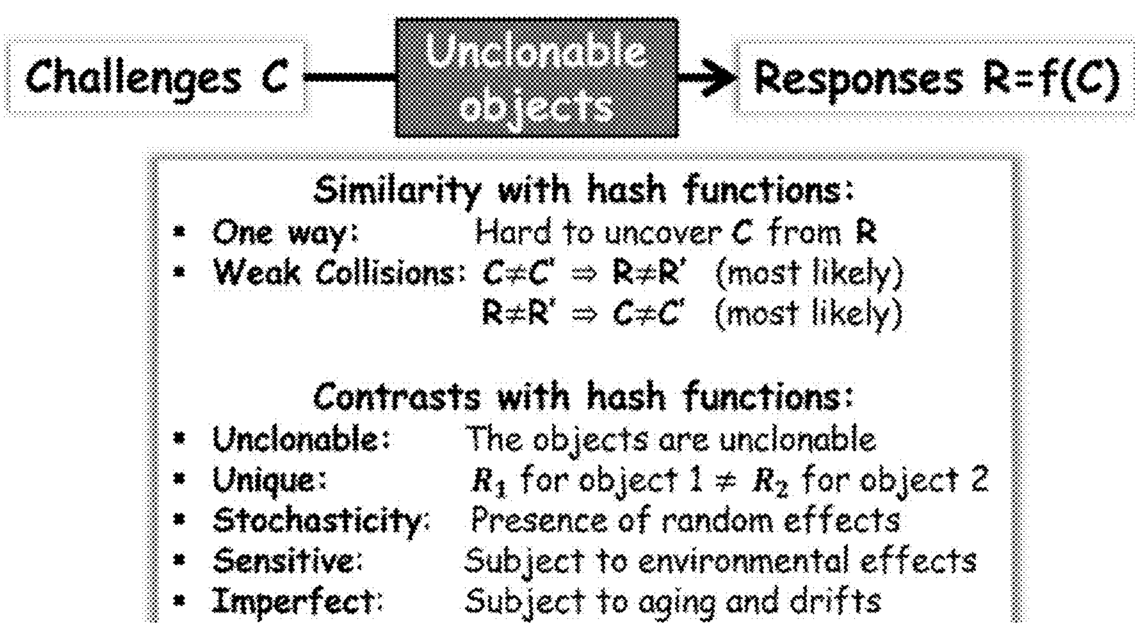
FIG. 1 conceptually depicts the generation of challenge-response pairs (CRP) with unclonable objects.

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrase "in one embodiment," "in an embodiment," and similar language throughout this specification may, but do not necessarily, all refer to the same embodiment.

It is contemplated that, in preferred embodiments, the methods described below will be carried out in a computing environment including two computing devices in electronic communication with one another. The first device will be referred to as a "server" or a "central" device, and the second device will be referred to as a "client" or a "terminal" device. References to "users" refer generally to individuals accessing a particular computing device or resource, to an external computing device accessing a particular computing device or resource, or to various processes executing in any combination of hardware, software, or firmware that access a particular computing device or resource. Both the client and server devices are, preferably, general purpose computing devices, which may include non-volatile storage, a programmable processor, input/output devices, and network interface devices. The non-volatile storage may encode computer readable instructions that, when executed, cause the processors in the server and client devices to execute the method steps described throughout this disclosure. The client devices discussed below preferably also include circuitry and electronic instruments necessary to measure a physical characteristic of a biological object and to generate responses from the resulting measurements. An optical image capture device such as a camera (having an optical imaging system, a 2-D detector and, optionally, illumination optics such as LEDs) is one example of such an electronic instrument. Other examples would include 2-D or 1-D flatbed scanners for taking image data of a fingerprint. In certain cases, the client device may be a smart phone including a camera. In certain cases, the central and remote devices may be processes running on the same device.

In the examples that follow, a biological object, unique to an individual, is used as an unclonable function, capable of generating unique and repeatable responses when measured according to certain measurement parameters (challenges).

In practice, the biological object is some feature of an individual user's body (e.g., a fingerprint). The challenges are instructions that specify a particular set of biological object measurement conditions. For example, a challenge might be a location on an image of a fingerprint, and an area at that location to be measured. Because the responses must be reliably repeatable for the same challenges, a pre-enrollment setup step is executed to generate data that is used to standardize all future image data taken from the object. In the case of taking image data from the object, the pre-enrollment data may enable the system to rotate and scale future images to a baseline orientation and scale before each response measurement.

Later, in an enrollment cycle, a server receives or generates one or more passwords. Referring to one of these passwords for simplicity, a password may be received from the user, or may be based on information received from the user which is subject to some subsequent process. A password may be received from a user via the client device, if the enrollment cycle occurs in an assumed trusted, secure environment, which it preferably does. The password may also be generated with a random number generator (RNG). The password may be any alphanumeric string reduceable to a bitstream through any encoding algorithm.

The server then generates a first random number (e.g., with an RNG), and then then applies a one-way cryptographic function to the password (e.g., a hash), iteratively, a number of times equal to the first random number. That is to say, the server hashes the password, hashes the hash, etc., a number of times equal to the first random number. Exemplary acceptable hashing algorithms include MD4, MD5, the SHA algorithms, DSA, Whirlpool, RIPEMD and BLAKE. The hashed password may be expanded, for example, with an expanded output function if this would be helpful to generate a bitstream that is long enough to derive a usable number of challenges. The resultant hashed password is then sent to a client device. The client uses the received hashed password as, or derives from the hashed password, a set of measurement instructions (challenges) to apply to the biological object to elicit responses (measured data). For example, the hashed password may be read by the client as a list of addresses in an image of fingerprint, each of which is measured for some image data, which is used to generate a response bitstream. The image data to which the challenges are applied by be stored image data at the client, but preferably is applied to contemporaneously captured image data of the user's biological object taken by an image capture device such as a camera. The image data is rotated with respect to a reference coordinate system and scaled according to pre-enrollment parameters established during pre-enrollment. Other calibration steps may also be performed. These rotation, scale and calibration steps are performed prior to responses being measured.

At the end of this enrollment cycle, the server stores only the password and the random number (reflecting the number of times the password was hashed). Preferably, all other data is erased, or not stored, including the challenge bitstream. The client stores only the measured responses and erases or does not store the challenges or any other data regarding the biological object, such as image data. At this point, it will be recognized that no clearly interpretable information about the biological object, such as an image of it, has been stored at any device. Preferably, all stored information is encrypted by the storing device.

Preferably both the pre-enrollment and enrollment steps described above occur in high trust environments.

Later, the client or server may wish to authenticate one other or engage in secure communications. To accomplish this, the devices will generate session keys to compare or to use as or as the basis for cryptographic keys to support encrypted communications. This session key generation process may begin with a request from either device to the other, or in some cases, only one device may begin the authentication process. It is contemplated that, generally, a client seeking to interact with a server (e.g., a user accessing financial account information) will request a secured session, and the server with initiate the authentication cycle in response to the request.

The server begins the authentication cycle by retrieving the stored password (after decryption). The server then generates a second random number, which is smaller than the first random number. The server then hashes the password, iteratively, a number of times equal to the second random number. This is used to create a challenge bitstream, which is passed to the client. The server computes a session key, which is the difference between the first random number (from the enrollment cycle) and the second random number. Assuming the client is able to recover the session key, both devices may compare session keys for mutual authentication. They may also use the session keys as, or as the basis of (i.e., as seeds for), cryptographic keys according to known symmetrical keying algorithms.

The client receives the second hashed password, which is interpreted as challenges to its physical object (i.e., a set of measurement conditions). The client then applies the challenges to the physical object to obtain a second set of responses. This may occur in the imaging context by applying the challenges to measure data in an image of the physical object, after the image has been rotated, scaled and otherwise calibrated according to the data established during pre-enrollment. The second set of responses is compared to the stored first set of responses from the enrollment cycle to determine whether there is a match. Here match means that the first and second bitstreams are similar to one another to within some threshold, such with a Hamming distance below some percentage threshold (e.g., 5%), or with a bit error rate at or below some threshold, e.g., (BNR) of 1, 2, 5, 10, 15, 20% etc. If there is no match, the client iteratively hashes the hashed password, generates response, and compares to the hash from the enrollment cycle until there is a match. The number of hashes applied to the second hashed password to reach the match condition is the session key.

While the method set forth above has been described in connection with a single password and a single corresponding random first and second numbers, it is not so limited. In preferred embodiment, the server generates a set of N passwords, each having a corresponding first random number during enrollment. This results in multiple challenge bitstreams, each corresponding to a password. These are sent to the client, which retrieves a set of responses, which are stored by the client. Later, the server generates a second random number for each password, the second number being less than the first number. Each password is iteratively hashed the number of times of the corresponding second random number, and this new set of challenges is sent to the client. The difference between the first and second random numbers for each password is a session subkey. The full session key may be built by the server from the session subkeys, e.g., through concatenation, multiplication, or any other combination process.

The client then receives the second set of challenges, and for each challenge, it repeats the iterative matching process described above: e.g., the user supplies contemporaneous biometric information, i.e., a new image of their face or finger print. The information is rotated, scaled and otherwise calibrated to the same standard conditions used during enrollment. The client applies each challenge to the image data and receives responses. The new responses are compared with the previously measured responses corresponding to that password. If there is no match, the challenges are hashed according to the same hashing algorithm used by the server. The process continues until each set of challenges has been hashed a number of times such that the result, when applied to the image data, elicits matching response data. At this point, the number of hashes required for each challenge corresponds to a subkey. The client then combines the subkeys in the same manner as the server, and the resulting session key can be used as above.

This disclosure will now focus on the pre-enrollment and CRP generation process for various sorts of biological objects.

The objective herein is to use biometry for authentication without keeping an image captured during enrollment in a local or centralized data base. The method presented in this disclosure is based on several layers of changes. The first one is to replace the unclonable objects with biometric prints and to generate meaningful challenge-response pairs (CRPs). A biometric print may be thought of as data representing the biological object, such as an image of the object. The second is to replace the pseudo-homomorphic authentication method described in the art, for example in U.S. patent application Ser. No. 17/879,697, with a protocol based on biometry to authenticate the users without storing the images in a database. Finally, error correcting methods are advantageous to reduce false reject rates (FFRs) during the authentication process.

Each biometric information is different from each other; fingerprints, face recognition, and irises are presented here as examples of embodiments. For each of these biological objects, the biometric print (e.g., image) must be standardized and a reference coordinate system applied to it so that the responses are repeatable. This standardization must occur each time a biometric print is taken (e.g., each time a facial image is taken with a camera). This standardization process, and the parameters that must be stored during the pre-enrollment stage to accomplish it, differs for each type of biological object.

For fingerprints, the challenge-response process starts with the orientation of the print based on a standard method, to explore the minutiae of a portion of the finger, then to digitalize the analysis. Subsequent CRPs will always start with the same initial orientation, but the portion of the finger, magnification, and orientation change at every CRP. The most difficult aspect of this method is to find a consistent reference for the orientation of the fingerprint.

The information available for facial recognition includes the shape and location of the eye, frontal, mouth, chin, nose, cuts, skin, etc. A reference object is quite trivial to find, for example drawing a line at the center of the eyes, the x-axis, and drawing the y-axes in the middle. The challenges are defined by the address of the starting point, magnification, and orientation. The responses are the digital analysis of the relevant features. Commercially available cameras on cell phones and PCs are accurate enough to give acceptable entropy to the method.

There are several distinct types of irises, each containing recognizable pattern, for example: flower, stream, jewel, and shaker. The problem of orientation can be resolved by asking the subject to stand straight. The CRPs are extracted in a way like the fingerprints or facial images, however higher magnifications of the images are needed which are available on certain cell phones.

Figure 2:
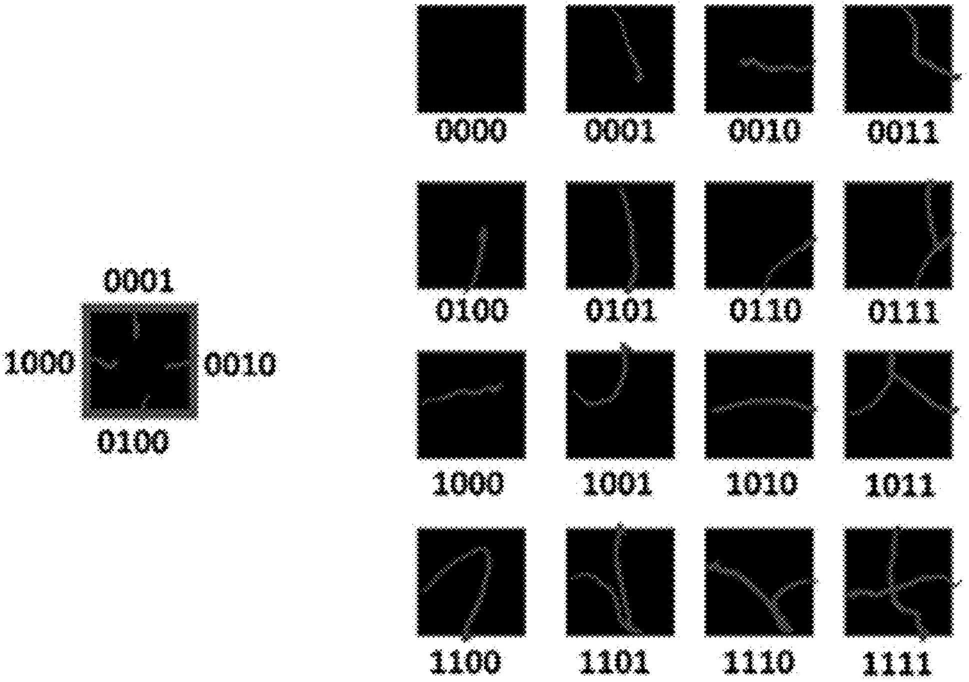
FIG. 2 is an example method of response generation in response to challenges to an unclonable biological object.

These examples are not limiting. The systems and methods described here are applicable to any unique and unclonable biological object that can be repeatably measured to generate responses, in particular, to biological objects that can be imaged. The requirement is that these objects should behave like a PUF. To behave like a PUF, both the challenges and the responses should be reducible to digital streams. That is to say, a "challenge" stream should be interpretable as a set of measurement instructions that will generate repeatable responses with high entropy, and the range of responses should be broad and variable enough to generate a wide range of digital values. One example, shown in FIG. 2, is the one when the challenges are the coordinates, size of a measurement square, and an angle of the orientation within the image of the biometric print; the responses are measuring which side of the squares are intercepted by features in the image 1000, 0100, 0010, or 0001. If 64 addresses of squares are addressed, the responses are 256-bit long. Many other ways to achieve such CRP generation are of interest, including, measuring the space between patterns, angles of deviation, density, shape, etc.

Pre-Enrollment Cycles and CRP Mechanisms for Biometric Prints

For this section, the "server" is the party initiating the enrollment cycle, and the "user" is the party providing the real life biometric information. The server could be a service provider interacting remotely, and the user could be a personal computer or smart phone with camera facing a subject. In this case, the server will enroll the subject for future pseudo-homomorphic authentication through the user's PC or phone. Another configuration is one in which the functions of the server and user are combined into a single terminal device, personal computer, or smart phone, facing a subject. This last case can operate in isolation from a network. During a preliminary enrollment cycle the biometric print of the subject will be analyzed without considerations for the details. A method to capture the reference x-axis and y-axis will be selected.

Although the exact same measurement equipment is used for repetitive authentication, the illumination, environmental conditions (e.g., temperature, humidity, etc.) or other influencing factors are expected to change. Furthermore, the subjects may not orient the biometric elements in the exact same way each time; the subjects may be subjected to changes such as different tans, hair shapes, and make-up. In addition to storing the reference x-y axis, other parameters are needed to better calibrate future enrollments. These include, but are not limited to:

- The distance between important reference points, such as the distance between the center of the eyes or between two major minutiae;
- The average illumination of the image, in terms of average greyness;
- The average density of information per square area; and
- The identification of the portions of the biometric print that should be ignored such as hairs, cuts, and temporary injuries.

This important information is stored by the user/client, not the server, with the understanding that leaks may occur, and therefore details are preferentially not included. That is to say, pre-enrollment data is stored that is in the nature of calibration and standardization data for future biological object measurements. What is preferably not stored are the biometric prints themselves, such as actual image data, which might be harmful to the user if stolen. A precise pre-enrollment is advantageous to enable accurate future authentication and the minimization of FRRs. Preferably, this pre-enrollment data is confirmed with multiple pre-enrollment cycles.

Pre-Enrollment Cycles for Fingerprints and CRP Mechanisms

Figure 3:
FIG. 3 depicts an example of a fingerprint with its set of minutiae.

An example of fingerprint is shown below in FIG. 3. In this case, two major minutiae are observed: one in the middle of the fingerprint and a second near the left bottom corner. Multiple smaller minutiae are visible across the image. Traditional fingerprint recognition techniques focus on these patterns, which are unique to each finger and relatively easy to detect. While any two features, including any two minutiae, may be used to define a reference axis and are within the scope of the invention, in the exemplary method described in this disclosure, only the localization of the major minutiae is used during the pre-enrollment cycle.

Figure 4:
FIG. 4 depicts an example of determining reference axes and scale during a pre-enrollment cycle according to an inventive method for a fingerprint.

As discussed above, during pre-enrollment (as well as the other stages) an image is taken (e.g., by a fingerprint scanner or a smart phone touchscreen running a fingerprint recognition process). The fingerprint image data is digitized and analyzed to identify two major minutiae. An x axis is defined connecting the identified major minutiae. This is shown in FIG. 4, where the x-axis connects the center of the two major minutiae. A y-axis is defined, which is orthogonal and crosses the x-axis at the center of the most central major minutia. Other y-axis crossing points could be used, such as the center point between the minutiae. Once these axes and minutiae positions are identified, future fingerprint image data can be rotated and scaled to match the pre-enrollment image data. This ensures that all measurements of the data (responses) are starting with comparable images.

This pre-enrollment cycle is of paramount importance for the authentication scheme and should follow pre-established protocols. As part of the coding algorithm, the ability to find again the same axis should be verified with multiple measurements upfront. If this verification is judged as non-reliable, other measurements of fingerprints are needed. Such an important step could incorporate machine learning algorithms, the use of more than two minutiae, as well as a set of instructions that will be memorized for future authentication cycle. Additional information should be captured and stored by the user's device for the calibration of future authentication, such as the average grading of shade of the entire image, distance between major minutiae, density per square area of the information, as well as any portions of the fingerprint that should be excluded or blanked during authentication such as edge, cuts, debris, etc. which can vary over time. As part of a prudent protocol, CRP mechanisms are tested during pre-enrollment.

Figure 5:
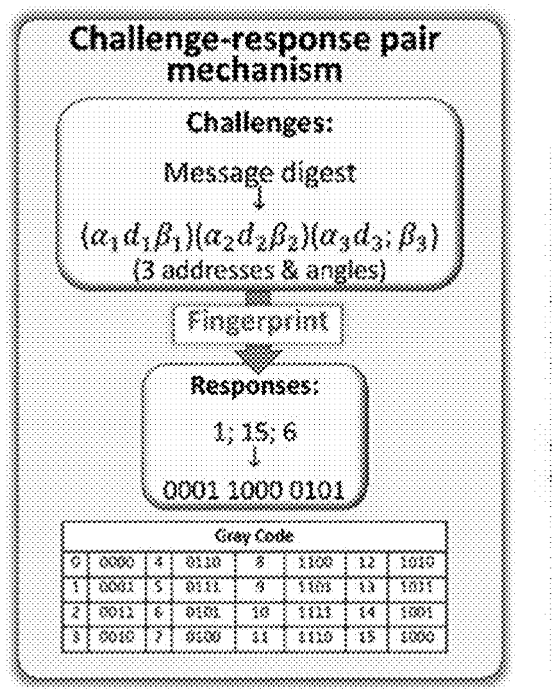
FIG. 5 depicts an example method of applying challenges and eliciting responses from a fingerprint image.
Figure 5:
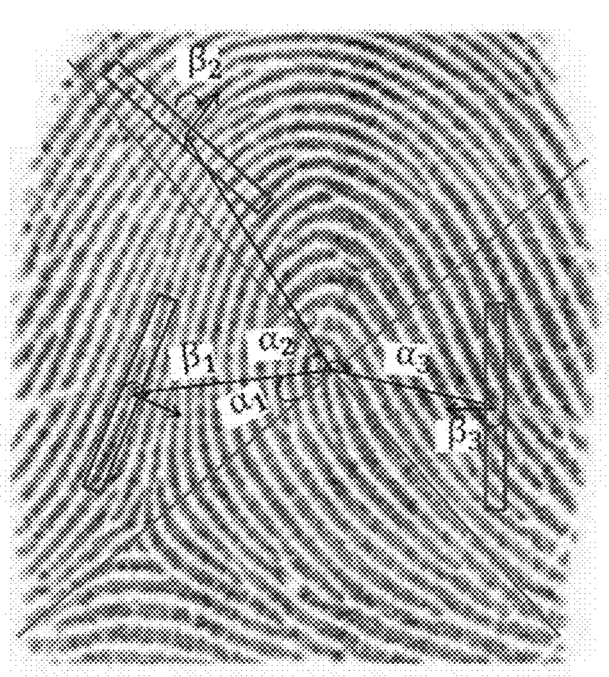

An example of how a fingerprint biometric print may be challenged, or measured, to generate responses is shown in FIG. 5. The input is a message digest that, if necessary, could be extended to a predetermined size with an extended output function (XOF). The extended message digest is converted into a set of addresses ($\alpha_i$ $d_i$) with associated angle of observation ($\beta_i$). The pixel values along the angle within a box centered at the address, having a predetermined size, are then red. This is represented by the purple boxes shown in the figure. The resulting pixel intensity signal is then analyzed with Fourier transform to count the average number of stripes, which extracts the fundamental frequency from the signal. The set of average number of stripes is rounded to a natural number and converted to a digital data stream using "Gray" codes to minimize the error rates. In preferred arrangements, the challenge bitstream is sufficiently long such that 20 different locations are analyzed for each challenge, yielding 80-bit long responses. The objective is to reduce the average number of errors to less than 20%, which is within the capabilities of the authentication protocol.

Pre-Enrollment Cycles for Facial Images and CRP Mechanisms

Figure 6:
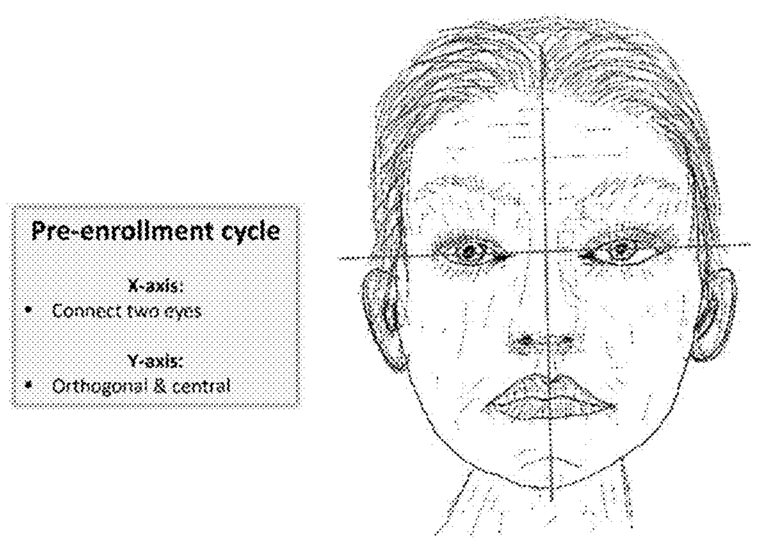
FIG. 6 depicts a method for establishing reference axes and scale during a pre-enrollment cycle according to an inventive embodiment for an image of a face.

Finding an orientation for facial recognition relatively easier than what is needed for fingerprint, because the center of the eye is round and well defined. As shown in FIG. 6, the x-axis of the reference of a facial image could be the one going through the middle of the eyes which is highly accurate. The y-axis is then the axis orthogonal with the x-axis at equal distance between the two eyes, which is again an accurate process.

Additional information should be captured and stored by the user's device for the calibration of future authentication, such as the average grading of shade of the entire image, distance between eyes, density per square area of the information, as well as the portion of the face that should be hided during authentication such as the hair, cuts, and injuries, which can vary constantly overtime. As part of a prudent protocol, CRP mechanisms are tested during pre-enrollment.

Figure 7:
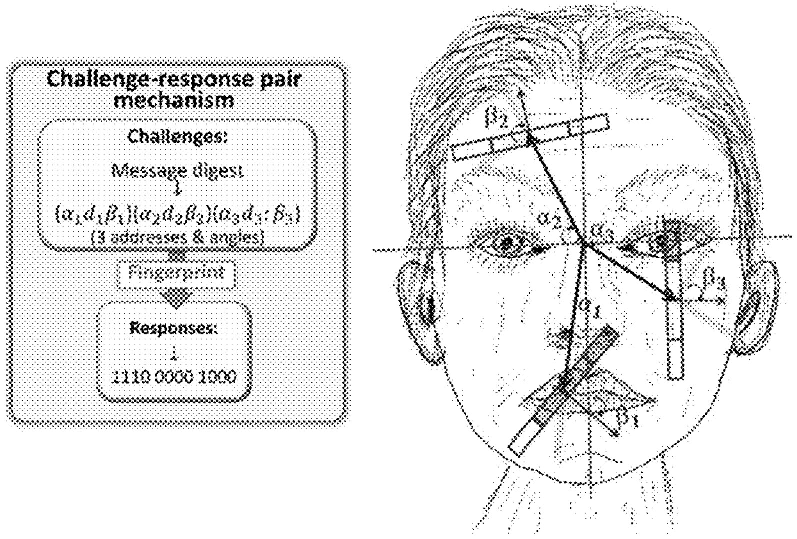
FIG. 7 depicts an example method of applying challenges and eliciting responses from a facial image.

An example of CRP mechanism for facial image is shown in FIG. 7. As done with fingerprints, the input is a message digest that, if necessary, could be extended to the right size with an extended output function (XOF). The extended message digest is converted into a set of addresses ($\alpha_i$ $d_i$) with associated angle of observation ($\beta_i$). The analysis to generate responses can be done based on multiple methods. As done with fingerprints, the signal can be scanned along the purple boxes shown in the figure, then analyzed with Fourier transform to find a frequency from the signal at that particular location. Another method, shown in FIG. 7, quantifies the grade of shade in a small box, counting a "1" when above a threshold, and a "0" below. In this case, the grading is normalized with the average value measured during pre-enrollment.

The conversion to a set of responses can also use methods to minimize the error rates, such as "Gray" codes. As done with fingerprints, multiple locations are analyzed for each challenge, for example 20, yielding 80-bit long responses. The objective is to reduce the number of errors to less than 20%, which is within the capabilities of the authentication protocol. Several methods to generate responses from the same challenges can be combined to enhance accuracy. For example, both grade of shadiness, and frequency after Fourier transform can be captured at each address.

Figure 8:
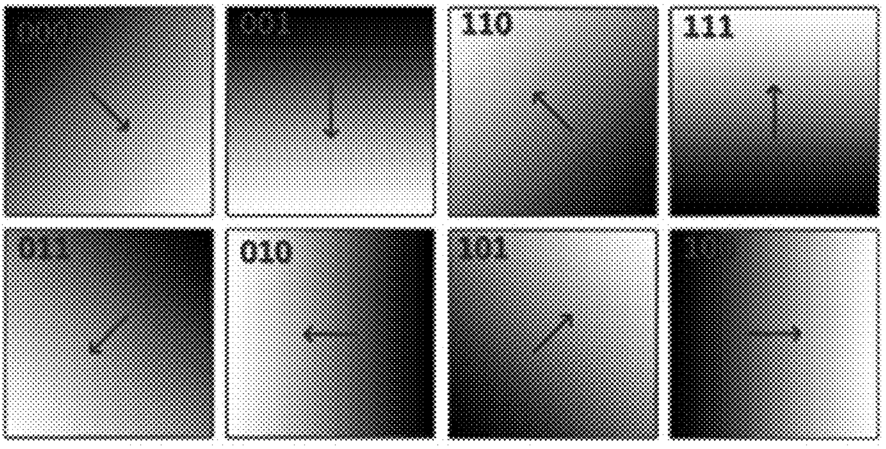
FIG. 8 depicts an arrangement for generating CRPs based on the orientation of shading of portions of an image of a biological object.

One variation of CRP protocol is the one where the generation of responses is based on the direction of the shading of greyness (FIG. 8).

Another method for extracting Challenge-Response pairs takes advantage of the uniqueness of human facial proportions. This method uses computer vision algorithms to identify a set $\mathcal{L}$ of N "landmarks" on a face, including but not limited to inner/outer eyes, nostrils, chin, jawline, and cheekbones. The relative positions of these landmarks will be unique to a given face.

The pre-enrollment necessary for this step is the same as previously described: an x-axis is formed by drawing a line connecting the centers of the subject's pupils, and a y-axis is formed by an orthogonal line intersecting the x-axis at the midpoint between the pupil centers. This strategy yields a consistent centering of the coordinate system used for addressing the scan, which will enable very consistent responses to repeated challenges.

Figure 9:
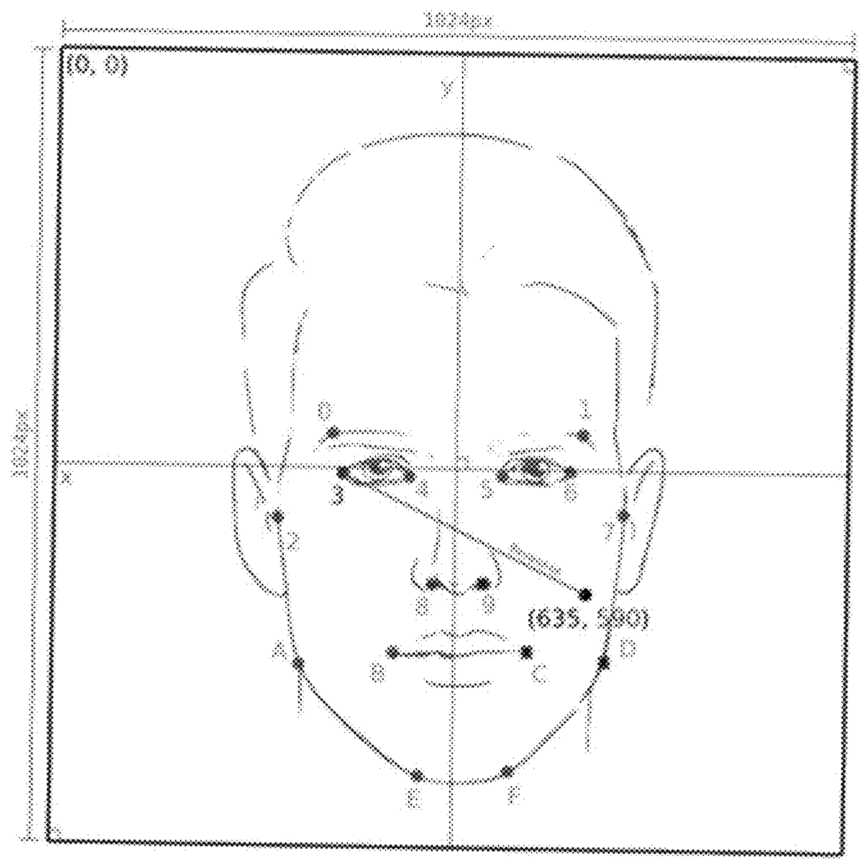
FIG. 9 depicts one embodiment of a Point-to-Landmark CRP mechanism for a facial image.

A set of sub-responses is extracted for each password. To begin, the set of N landmarks $\mathcal{L}=\{L_0, L_1, \ldots, L_i, L_{N-1}\}$ is enumerated. The challenge is a data stream that is divided into K 3-tuples of numbers which are used to challenge the scan. Each 3-tuple is further divided into a coordinate pair p=(x, y) and a number i pointing at the landmark point $L_i$ with $i \in \{0, N-1\}$. Together, these K pieces of information represent the challenge. The scan's response to each segment of the challenge is the magnitude of the vector connecting the point at the coordinate pair p to the landmark L, $$\|\overrightarrow{pL}\|. \quad \text{(FIG. 9)}$$

If it is assumed that a typical face will occupy approximately half of the total pixels in a scan, then the magnitudes of responses in the case of a facial scan of total dimension W×H would be on average approximately $$\frac{\sqrt{W^2+H^2}}{4}$$

or about ¼ of the corner-to-corner distance of the frame. The average number of bits per response would thus be $\log_2$ $$\left(\frac{\sqrt{W^2+H^2}}{4}\right).$$

By this model, in the case of the illustrated example (FIG. 9), a 1-megapixel face scan could yield an average of $\log_2$ $$\left(\frac{\sqrt{1024^2+1024^2}}{4}\right) \approx 8$$

bits of response per segment of the challenges and a strong 64-bit response could be obtained with K=8, which is long enough as a challenge to avoid collisions during key recovery in the pseudo-homomorphic scheme presented in this disclosure.

The challenges can be 256-bit long message digests, that can eventually by extended with an extended output function (XOF such as SHAKE) for 256-bit long responses, can produce enough information for creating challenges that are long enough for cryptography.

The responses from such challenges will be subject to some natural variation, but the floor or ceiling (or some other method of rounding/approximating) of the computation could be taken as the final response value, which would make the CRP mechanism more robust to minor variations while preserving the ability to capture the uniqueness of inter-face responses and providing consistent intra-face responses for a particular face. As discussed in previous cases, error mitigation techniques such as Gray codes can reduce the bit error rates. Full error correcting codes are needed for the protocols requesting zero error.

The embodiment of this last method can eliminate the landmarks that are too close to the coordinate pair p=(x, y), thereby enhancing the obfuscation of the pairing.

Enrollment Cycles for Pseudo-Homomorphic Authentication

Figure 10:
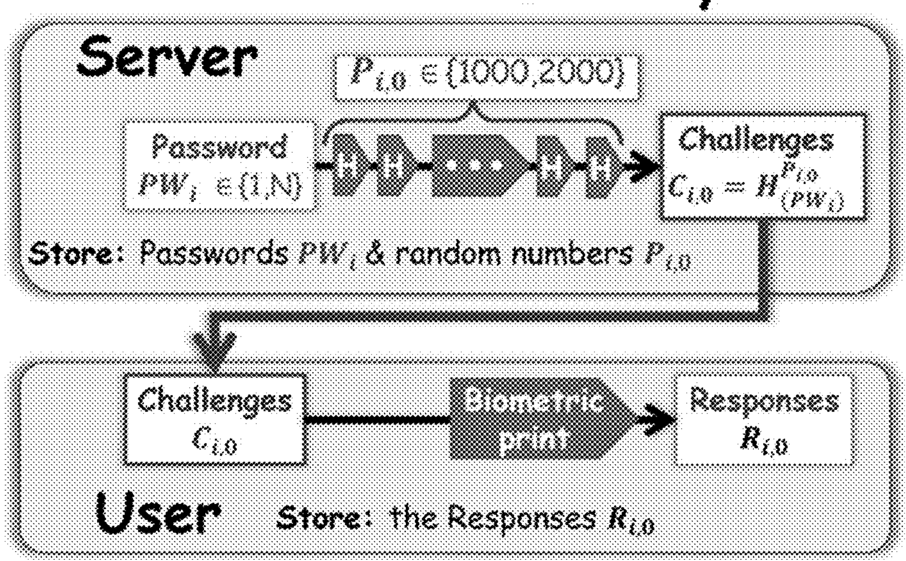
FIG. 10 conceptually depicts a computing environment performing a method of performing an initial enrollment cycle according to an inventive embodiment.

After the pre-enrollment cycle that was described above, the next step of the protocol is the initial enrollment cycle. While both enrollment cycles should be performed in a secure environment, the authentication cycles are expected to happen in a zero-trust network. An example of enrollment cycle for pseudo-homomorphic authentication is described in FIG. 10:

The server begins the process by generating a set of N passwords $PW_i$, with $N \in \{1,N\}$, and an initial set of N random numbers $P_{i,0}$ that are large enough, for example $P_{i,0} \in \{1000, 2000\}$. The server hashes the set of passwords $PW_i$, with the corresponding random numbers $P_{i,0}$. The resulting set of message digests $H^P_{i,0}(PWi)$ becomes a set challenges $C_{i,0}$ that are transmitted secretly to the user. After this cycle the server only memorizes the set of N passwords $PW_i$, and the set of N random numbers $P_{i,0}$, and erases all other information.

The user transforms the set of challenges $C_{i,0}$ into a set of instructions to explore the biometric print, using the reference axis generated during pre-enrollment. This process results in the generation of a set of responses $R_{i,0}$. An example of response generation process is the one presented previously and in FIG. 2. After this cycle the user only memorizes the set of responses $R_{i,0}$ and erases the challenges.

N, the number of passwords, can be small (for example, 10) if the biometric print has large entropy. However, when the biometric prints do not contain rich information, N can be increased orders of magnitudes. To comprehend aging, and constant drifting of the biometric prints, the pre-enrollment cycles could be repeated.

Authentication Cycle in Contested Area

Figure 11:
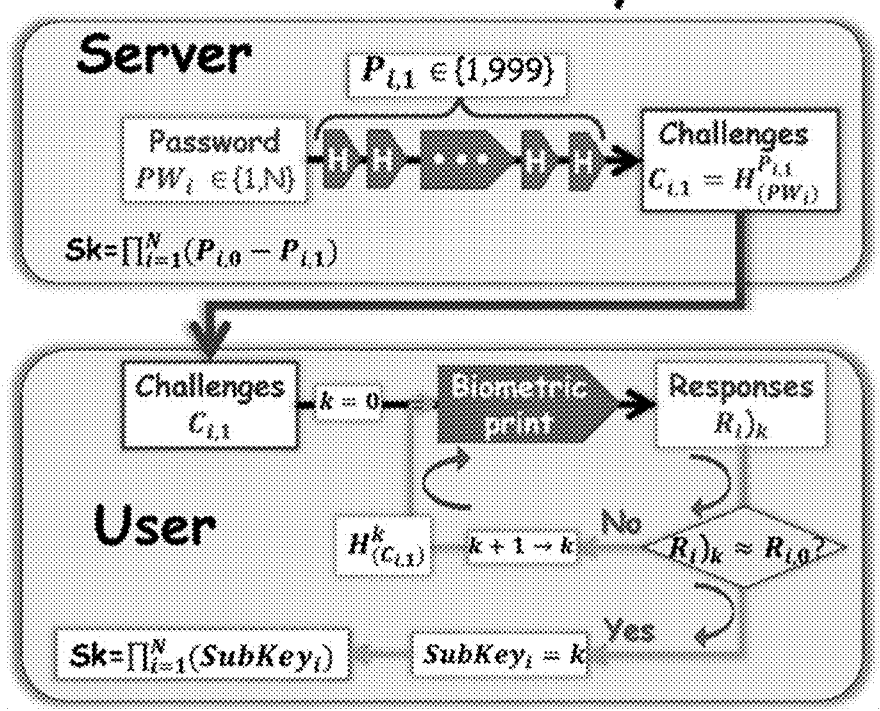
FIG. 11 conceptually depicts a computing environment performing a method of performing an authentication cycle according to an inventive embodiment.

The authentication cycle is needed to verify the identity of the user based on real-time observation of its biometric prints. The process, as shown in FIG. 11, is also initiated by the server:

The server begins the process by generating a new set of N random numbers $P_{i,1}$ that are smaller than the initial random numbers, for example $P_{i,1} \in \{1, 999\}$. The server hashes the set of passwords $PW_i$, with the corresponding random numbers $P_{i,1}$. The resulting set of message digests $H_{i,1}{}^P(PWi)$ becomes the new set of challenges $C_{i,1}$ that are transmitted to the user. After this cycle the server computes a shared session key Sk from these random numbers, for example by multiplying the differences:

$$Sk = \prod\nolimits_{i=1}^{N} (P_{i,0} - P_{i,1})$$

Another method to compute Sk is to hash the differences and concatenate the message digests.

The user transforms the set of challenges $C_{i,1}$ into a set of instructions to explore the biometric print, using the reference axis generated during pre-enrollment. This process is an iterative process, which has the objectives to uncover the set of parameters $SubKey_i$, each equal to the corresponding factor $(P_{i,0}-P_{i,1})$. Each challenge $C_{i,1}$ thereby needs to be hashed $(P_{i,0}-P_{i,1})$ times to result in the generation of responses that are approximately equal to $R_{i,0}$. It is here anticipated that although the biometric prints are never exactly the same, the response generation process can be consistent enough to minimize FRRs. Additional error correcting codes (ECC) can enhance the reliability of the scheme. The client retrieves the same shared session key by multiplying the sub-keys:

$$Sk = \prod\nolimits_{i=1}^{N} (SubKey_i)$$

Security Considerations

The main objective of the method presented in this section is to control the access to the network with the use of biometry. By leveraging pseudo-homomorphic authentication, the method has certain advantages: the server never discloses its passwords; the user never discloses its biometric prints; the pseudo-homomorphic protocol results in two-way authentication; the user does not have to store the session key after completion of the cryptographic protocol, therefore reducing its exposure to a limited time period, for higher security, the session keys may be used only once. The security of the scheme is limited by the quality of the biometric prints, and their recognition. Reliable, strong, and tamper resistant information is desirable.

Combining Multiple Biometric Prints and PUFs

The protocols described previously are based on CRP mechanisms and can be applied to several biometric prints, and mainstream PUFs. The set of N passwords, with associated set of CRPs can be distributed in the following way:

Some of the CRP mechanisms with the same biometric print can be based on different methods. For example, half of the CRPs can use Fourier transform methods, while the second half can use the shading of greyness method. Generally, different sorts of responses can be elicited from the same biological object, or data regarding that biological object such as image data. In certain embodiments, this can be done by interpreting a first part of a challenge bitstream as challenges to elicit a first type of response, and a second part of the challenge bitstream as challenges to elicit a second type of response. In other embodiments, different sub-challenges (hashes of different random numbers) can be read as different sorts of challenges to elicit different sorts of responses. In yet other embodiments, the same challenge can be interpreted to elicit different sorts of responses. For example, a challenge that is read as an address and an area of an image can be used to elicit both frequency data and grayness data, as described above.

Some of the CRP mechanisms can use different biometric prints and more conventional (e.g., electronic) PUFs. For example, a first part of the CRPs can be based on biometry, while a second part can be based on PUFs. That is to say, the challenges received from the server may be applied to both a PUF and to data regarding the biological object at the client device.

It should be understood that, unless explicitly stated or otherwise required, the features disclosed in embodiments explicitly described herein and elsewhere in this disclosure may be used in any suitable combinations. Other embodiments and uses of the above inventions will be apparent to those having ordinary skill in the art upon consideration of the specification and practice of the invention disclosed herein. It should be understood that features listed and described in one embodiment may be used in other embodiments unless specifically stated otherwise. The specification and examples given should be considered exemplary only, and it is contemplated that the appended claims will cover any other such embodiments or modifications as fall within the true scope of the invention.

The invention claimed is:

1. A method of generating and using a session key at a client device, comprising:

receiving a first challenge bitstream, the first challenge bitstream comprising a password that has been iteratively hashed a first number of times according to a hashing method;

generating, from the first challenge bitstream, a first series of challenges, the first series of challenges specifying measurement conditions for measuring physical properties of a biological object;

measuring the biological object according to the first series of challenges;

receiving a first response bitstream from the measurement of the biological object;

storing the first response bitstream;

receiving a second challenge bitstream, the second challenge bitstream comprising the password that has been iteratively hashed a second number of times by the hashing method, the second number of times being less than the first predetermined number of times;

iteratively performing the following steps n times until a stop condition is reached:

hashing the second challenge bitstream using the hashing method;

generating from the hashed second challenge bitstream a second series of challenges;

measuring the biological object according to the second series of challenges;

receiving a second response bitstream from the measurement of the biological object; and comparing the first response bitstream to the second response bitstream, wherein the stop condition is reached when the first response bitstream matches the second response bitstream, and using n as a session key.

2. The method of claim 1, wherein the biological object is one of a human face, fingerprint, iris or retina.

3. The method of claim 1, wherein measuring the biological object according to the first and second series of challenges comprises taking electronic image data from the biological object and extracting data about the biological object from the image data on the basis of the challenges.

4. The method of claim 3, wherein extracting data about the biological object from the image data on the basis of the challenges comprises taking a Fourier transform of the image data and extracting one or more frequencies of features in the image data from the Fourier transform.

5. The method of claim 3, wherein extracting data about the biological object from the image data on the basis of the challenges comprises determining the density or level of grayness of one or more portions of the image data identified by the challenges.

6. The method of claim 3, wherein extracting data about the biological object from the image data on the basis of the challenges comprises determining an orientation of a gradient of shading or grayness of one or more portions of the image data identified by the challenges.

7. The method of claim 1, further comprising pre-enrolling the client device by taking repeated calibration measurements of the biological object, determining calibration data on the basis of the repeated measurements, storing the calibration data, and applying the calibration data during future measurements.

8. The method of claim 7, wherein determining calibration data comprises defining the orientation and origin of a reference coordinate system with respect to identifiable features of the biological object, and wherein applying the calibration data during future measurements comprises aligning image data of the biological object to the reference coordinate system.

9. The method of claim 8, wherein aligning image data of the biological object to the reference coordinate system comprises rotating and translating the image data with respect to the reference coordinate system.

10. The method of claim 7, wherein determining calibration data on the basis of repeated measurements comprises determining a size value of the biological object, and wherein applying the calibration data during measurements comprises scaling image data of the biological object according to the size value.

11. The method of claim 1, wherein the hashing method is one of SHA-1, SHA-2, SHA-3, Shake, or a lighter custom hash function.

12. The method of claim 1, wherein using n as a session key comprises combining n with a plurality of additional subkeys.

13. The method of claim 1, wherein using n as a session key comprises using n to generate an encryption key according to a symmetrical keying algorithm.

14. The method of claim 1, wherein measuring the biological object according to the first and second series of challenges comprises taking an electronic image of the biological object with an image capture device and extracting data from the electronic image in accordance with the first and second challenges.

15. The method of claim 1, wherein when the first response bitstream matches the second response bitstream occurs when the first response bitstream is within a predetermined Hamming distance from the second response bitstream.

* * * * *